United States Patent
Cho et al.

Patent Number: 6,158,039
Date of Patent: *Dec. 5, 2000

[54] SYSTEM DECODER HAVING ERROR CORRECTING MEMORIES FOR HIGH-SPEED DATA PROCESSING AND TRANSMISSION AND METHOD FOR CONTROLLING SAME

[75] Inventors: Chan-Dong Cho, Suwon; Jae-Seong Shim; Jong-Sik Jeong, both of Seoul; Byung-Jun Kim, Suwon, all of Rep. of Korea

[73] Assignee: Samsung Electronics Co., Limited, Suwon, Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 09/007,662

[22] Filed: Jan. 15, 1998

[30] Foreign Application Priority Data

Jan. 15, 1997 [KR]  Rep. of Korea ......................... 97-1032

[51] Int. Cl.[7] .................................................. G11C 29/00
[52] U.S. Cl. .............................................. 714/769; 369/32
[58] Field of Search .................................... 714/769, 770, 714/763; 369/30, 32

[56] References Cited

U.S. PATENT DOCUMENTS

| | | | |
|---|---|---|---|
| 4,562,577 | 12/1985 | Glover et al. | 371/38 |
| 4,587,643 | 5/1986 | Monen et al. | 369/32 |
| 4,611,314 | 9/1986 | Ogata et al. | 369/32 |
| 4,633,471 | 12/1986 | Perera et al. | 371/38 |
| 4,788,685 | 11/1988 | Sako et al. | 371/38 |
| 5,046,095 | 9/1991 | Akiyama | 380/50 |
| 5,216,677 | 6/1993 | Takagi et al. | 371/40.3 |
| 5,502,703 | 3/1996 | Yamada et al. | 369/60 |
| 5,546,461 | 8/1996 | Ibaraki et al. | 380/20 |
| 5,561,649 | 10/1996 | Lee et al. | 369/47 |
| 5,757,737 | 5/1998 | Tanaka | 369/32 |
| 5,767,798 | 6/1998 | Won | 341/59 |
| 5,881,106 | 3/1999 | Cartier | 375/262 |
| 6,072,755 | 6/2000 | Kim et al. | 369/32 |

FOREIGN PATENT DOCUMENTS

| | | |
|---|---|---|
| 0233783 A1 | 8/1987 | European Pat. Off. . |
| 0314524 A2 | 5/1989 | European Pat. Off. . |
| 2 321 333 | 7/1998 | United Kingdom ............ G11B 20/18 |
| WO 94/14159 A1 | 5/1994 | WIPO . |

*Primary Examiner*—Albert De Cady
*Assistant Examiner*—Samuel Lin
*Attorney, Agent, or Firm*—Staas & Halsey LLP

[57] ABSTRACT

A system decoder having error correcting memories for high-speed data transmission and a method for controlling the same. A system decoder of an optical disk reproducing apparatus having a descrambler for restoring scrambled data in the process of encoding data, includes first and second memories for correcting an error, and a memory controller for transmitting error-corrected data to the descrambler while data read and demodulated from the optical disk is written in one of the first and second memories, and error-correcting data written in the other memory while the demodulated and error-corrected data is written and read.

28 Claims, 8 Drawing Sheets

SYSTEM DECODER HAVING ERROR CORRECTING MEMORIES FOR HIGH-SPEED DATA PROCESSING AND TRANSMISSION AND METHOD FOR CONTROLLING SAME

BACKGROUND OF THE INVENTION

1. Field of the Invention

The present invention relates to a system decoder of an optical disk reproducing apparatus, and in particular, to a system decoder having error correcting memories for high-speed data transmission and a method for controlling the same.

2. Description of the Related Art

An optical disk reproducing apparatus such as a laser disk (LD) player or a compact disk (CD) player has been widely accepted for home use since an optical disk technique which can read data recorded in a recording medium by using a laser beam was established about 20 years ago. A recording/reproducing apparatus using such an optical disk has been put to practical use. Recently, with the development of shortwave laser or recording/reproducing technique in addition to an overwrite technique, progress has been made in increasing the recording density of the optical disk.

Meanwhile, a digital image compression technique has been advancing rapidly. In particular, the MPEG2 (Moving Picture Experts Group 2) can reproduce picture quality to a sufficient degree so as to be received in the household at a data transmission rate of close to 10 Mbps. In the field of audio reproduction, an audio compression technique AC-3 which is capable of reproducing multichannel audio leads to high tone quality and multi-sound. Together with a recordable digital video (or versatile) disk, a digital video disk (DVD) is expected to play an important role in a CD-ROM as well as a video tape recorder (VTR) which is an existing video recording/reproducing apparatus. Such a DVD is one type of digital moving picture disk media and is a multimedia storage device of high picture quality and high tone quality which can store an MPEG2 digital image of 2 hours or more.

Figure 1:
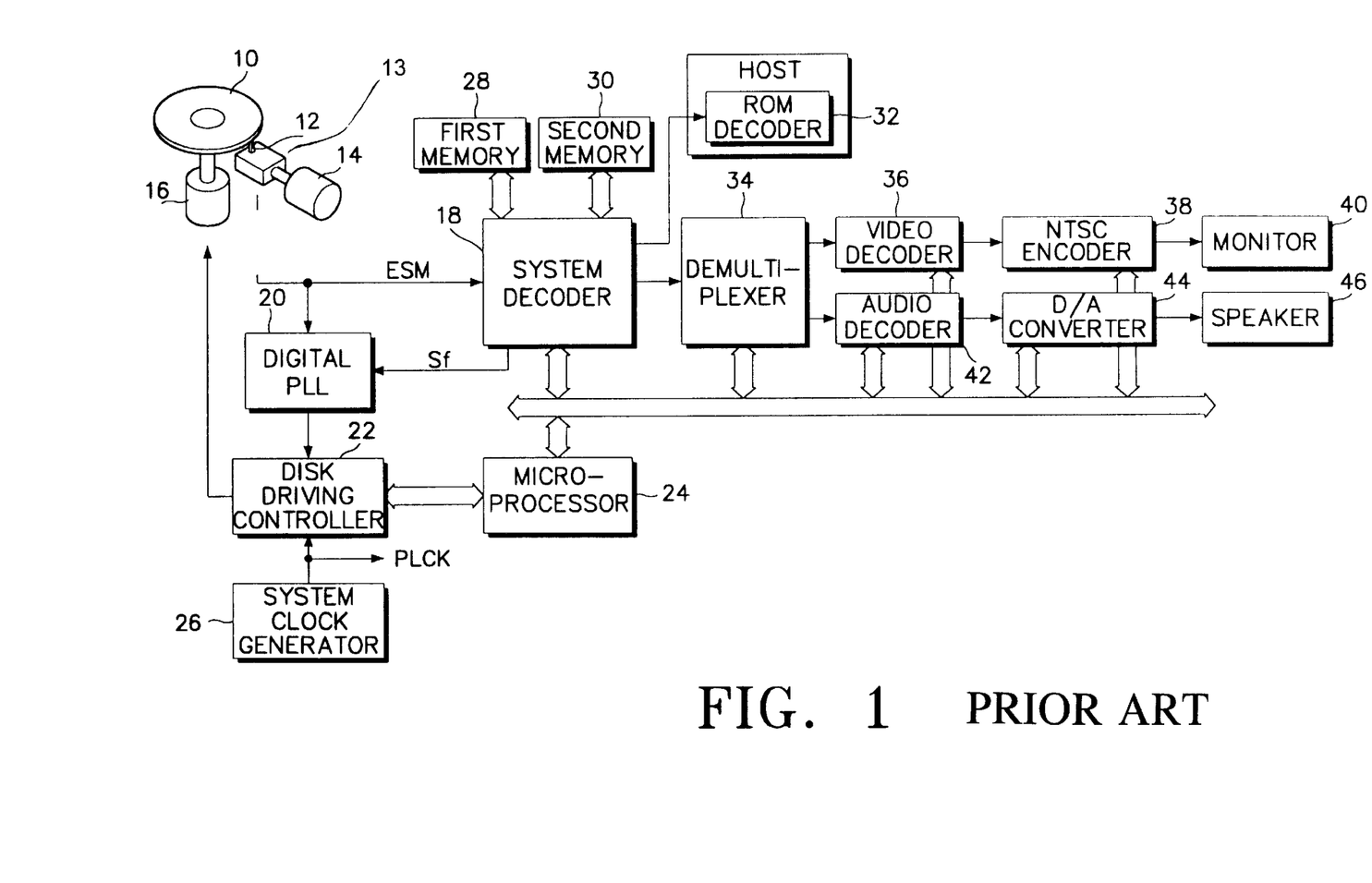
FIG. 1 is a block diagram of a general digital video (or versatile) disk reproducing apparatus.

FIG. 1 schematically illustrates a general DVD reproducing apparatus. As an optical disk 10 rotates by a disk motor 16, an optical pickup 13 which is driven by a sled pickup motor 14 and includes a head 12 converts data reproduced from the optical disk 10 into an analog RF (Radio Frequency) signal. This analog RF signal is shaped into a pulse waveform and a data stream ESM is transmitted to a digital PLL (Phase Locked Loop) 20 and a system decoder 18. The system decoder 18 demodulates, error-corrects, and descrambles the data stream ESM. The digital PLL 20 including a phase comparator, a voltage controlled oscillator, a frequency divider, etc., generates a first clock in synchronism with a signal reproduced from the optical disk 10. A disk driving controller 22 controls a constant linear velocity of the rotation of the optical disk 10 and other disk related operations in consideration of frequency servo, phase servo, etc., according to a frame synchronizing signal Sf provided from a synchronous detector (not shown) of the system decoder 18.

A microprocessor 24 controls the overall operation of the DVD reproducing apparatus according to a control program. For instance, if a data transmission start signal is received from an audio decoder 42, a video decoder 36 or a ROM (Read Only Memory) decoder 32, the microprocessor 24 generates a transmission control signal. A system clock generator 26, which is a crystal oscillator, generates a second clock of a system clock PLCK and transmits the system clock PLCK to the disk driving controller 22 and an error corrector (not shown). A first memory 28 connected to the system decoder 18 is a memory for correcting an error and uses a SRAM (Static Random Access Memory). A second memory 30 which is a track buffer memory uses a DRAM (Dynamic Random Access Memory). The ROM decoder 32 which is mainly contained in a host (for example, a personal computer) operates according to a command of the host and transmits data generated from the system decoder 18 to the host according to an interface type. A demultiplexer 34 receives audio and video signals from the system decoder 34, and transmits multiplexed audio and video signals to the AC3/MPEG audio decoder 42 and the MPEG2 video decoder 36, respectively. Video data and audio data respectively decoded from the video decoder 36 and the audio decoder 42 are transmitted to an NTSC (or PAL) encoder 38 and a digital-to-analog (D/A) converter 44 and output through a monitor 40 and a speaker 46, respectively.

Figure 2:
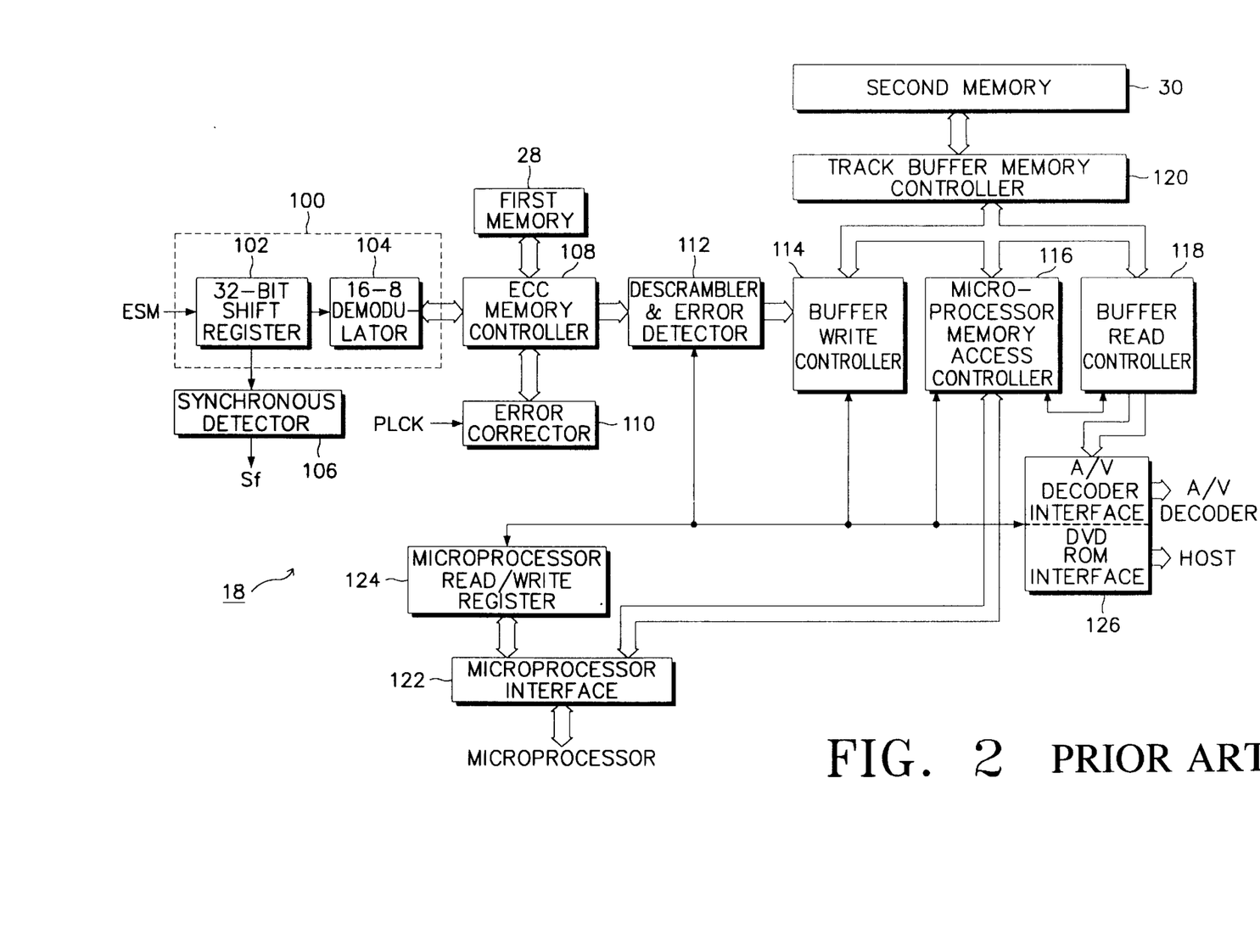
FIG. 2 is a detailed block diagram of a system decoder shown in FIG. 1.

FIG. 2 is a detailed block diagram of the system decoder 18 shown in FIG. 1. The first memory 28 used for error correction is the SRAM. The second memory 30 used for data buffering is the DRAM. The data stream ESM read through the head 12 is demodulated through a 32-bit shift register 102 and a 16-8 demodulator 104 of an EFM demodulator 100. A synchronous detector 106 detects the frame synchronous signal Sf from data generated from the 32-bit shift register 102 and transmits the detected frame synchronous signal Sf to the digital PLL 20. Meanwhile, data demodulated through the EFM demodulator 100 is stored in the first memory 28 under the control of an error correcting code (ECC) memory controller 108. The data stored in the first memory 28 is read by blocks under the control of the ECC memory controller 108 and then transmitted to an error corrector 110. Data error-corrected from the error corrector 110 is transmitted to a descrambler and error detector 112 under the control of the ECC memory controller 108. A descrambler of the descrambler and error detector 112 restores data scrambled in the process of encoding data, and an error detector thereof detects an error of the descrambled data. The descrambling and error detection are carried out by sectors. Error information detected from the descrambler and error detector 112 is stored in the second memory 30 under the control of a microprocessor memory access controller 116, together with data. The microprocessor memory access controller 116 controls a buffer write controller 114, a buffer read controller 118 and a track buffer memory controller 120 under the control of the microprocessor 24 through a microprocessor interface 122. The buffer write controller 114 writes data descrambled and error-detected from the descrambler and error detector 112 in the second memory 30 under the control of the microprocessor memory access controller 116. The buffer read controller 118 reads the data stored in the second memory 30 under the control of the microprocessor memory access controller 116 and transmits the read data to an audio/video (A/V) decoder interface and a DVD-ROM interface 126. The microprocessor interface 122 interfaces transmitting/receiving signals between the system decoder 18 and the microprocessor 24.

In operation, the synchronous detection, identification (ID) detection and demodulation of the data stream are performed. Next, the error detection and correction are implemented. Thereafter, the descrambling, error detection and track buffering of the error-corrected data are executed. The first memory 28 has a first region for buffering EFM demodulated data, a second region for error-correcting a buffered error correcting block horizontally and vertically, and a third region for transmitting error-corrected data to the second memory 30. That is, the ECC memory controller 108 stores the EFM demodulated data in the first region of the first memory 28, reads and error-corrects the data stored in the first region by blocks using the second region, stores the error-corrected data in the third region of the first memory 28, and transmits the data stored in the third region to the second memory 30. In this data processing, the ECC memory controller 108 processes data in the order of: data reading, error correction, data transmission, data reading, error correction and data transmission. That is, since data is accessed from three regions of one memory, an error correcting speed is deteriorated. Therefore, the optical disk reproducing apparatus having such a system decoder 18 has a slow data processing speed and a slow data transmission speed.

SUMMARY OF THE INVENTION

It is therefore an object of the present invention to provide a system decoder having error correcting memories which can speed up data processing and data transmission by improving an error correcting speed in an optical disk reproducing apparatus.

It is another object of the present invention to provide a method for controlling error correcting memories, which can improve an error correcting speed in an optical disk reproducing apparatus having a system decoder.

Additional objects and advantages of the invention will be set forth in part in the description which follows and, in part, will be obvious from the description, or may be learned by practice of the invention.

According to one aspect of the present invention, a system decoder of an optical disk reproducing apparatus having a descrambler for restoring scrambled data in the process of encoding data, includes first and second memories for correcting an error, and a memory controller for transmitting error-corrected data to the descrambler while data read and demodulated from the optical disk is written in one of the memories, and error-correcting data written in the other memory while the demodulated and error-corrected data is written and read.

According to another aspect of the present invention, a method for controlling first and second error correcting memories of an optical disk reproducing apparatus, includes the steps of: alternatively writing one error correcting block in the first and second memories upon receiving demodulation data of one data sector including main data, inner parity data and outer parity data, error-correcting a corresponding one error correcting block; and reading error-corrected data from one of the first and second memories when writing one error correcting block in the other one of the first and second memories.

BRIEF DESCRIPTION OF THE DRAWINGS

These and other objects, features and advantages of the present invention will be more apparent from the following detailed description when taken in conjunction with the accompanying drawings in which.

DETAILED DESCRIPTION OF THE PREFERRED EMBODIMENTS

A preferred embodiment of the present invention will be described in detail hereinbelow with reference to the accompanying drawings. It should be noted that like reference numerals designate like elements throughout several views. In the following description, numerous specific details, such as the size of an error correcting block, a one-word recording time, a maximum accessed number, detailed processing flows, etc., are set forth to provide a more thorough understanding of the present invention. It will be apparent, however, to one skilled in the art that the present invention may be practiced without these specific details. In other instances, well-known functions or constructions which may obscure the present invention in unnecessary detail are not described in detail.

Figure 3:
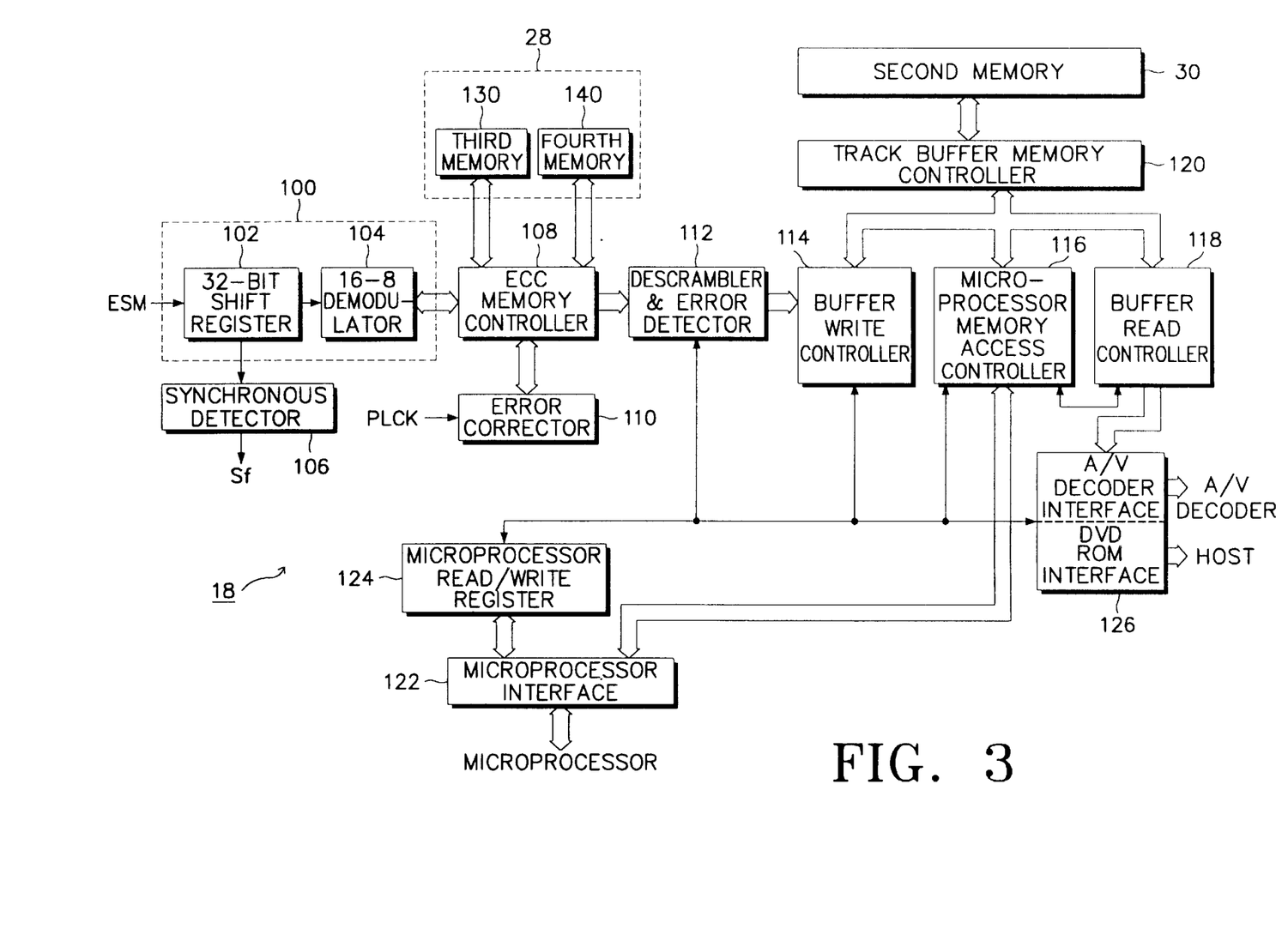
FIG. 3 is a detailed block diagram of a system decoder according to an embodiment of the present invention.

Referring to FIG. 3, a system decoder according to the present invention has the same construction as the system decoder 18 of FIG. 2, except for third and fourth memories 130 and 140. The third and fourth memories 130 and 140 are error correcting memories and use SRAMs. Moreover, they are formed within a single chip.

Figure 4:
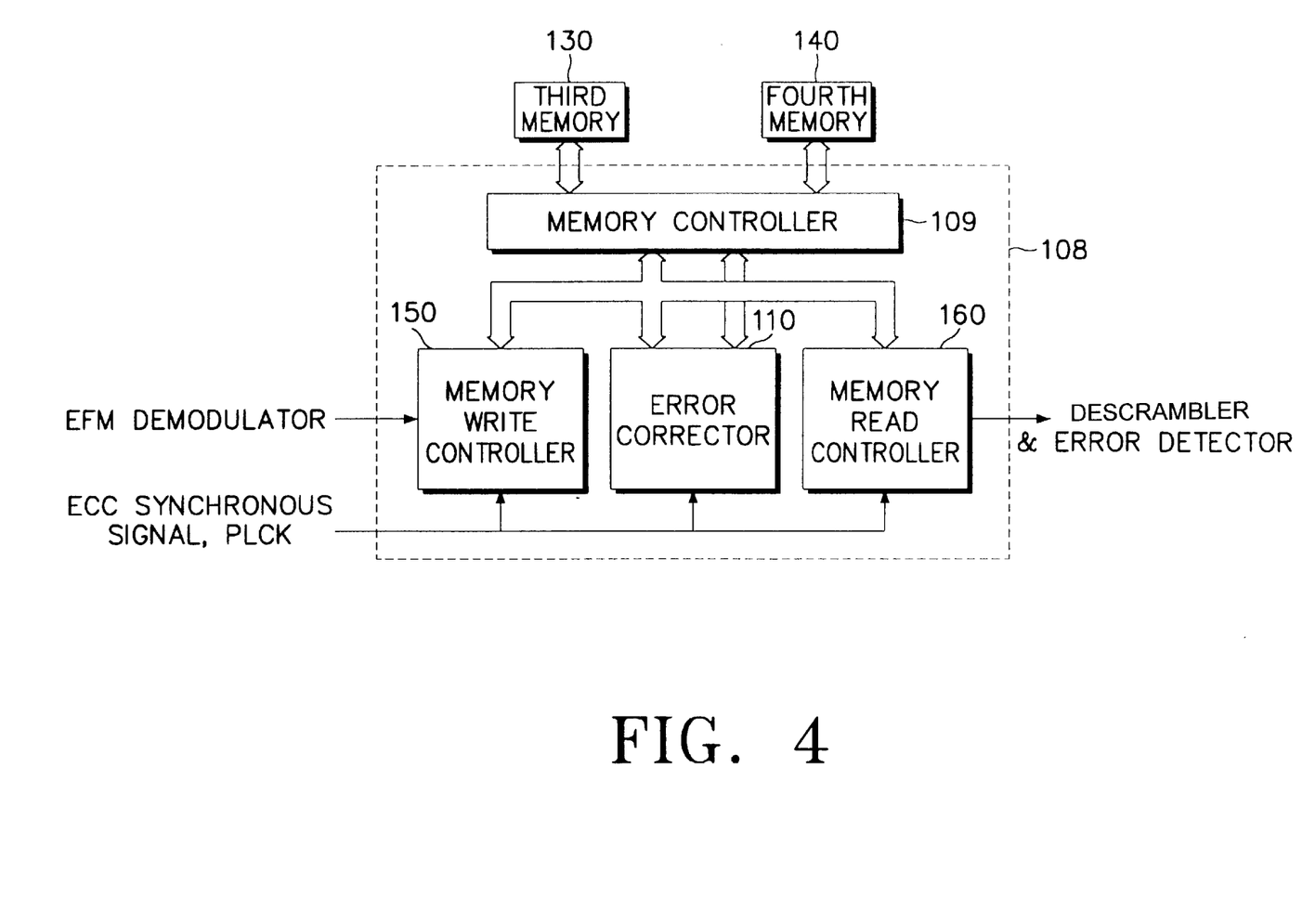
FIG. 4 is a detailed block diagram of an ECC memory controller shown in FIG. 3 according to the embodiment of the present invention.
Figure 5:
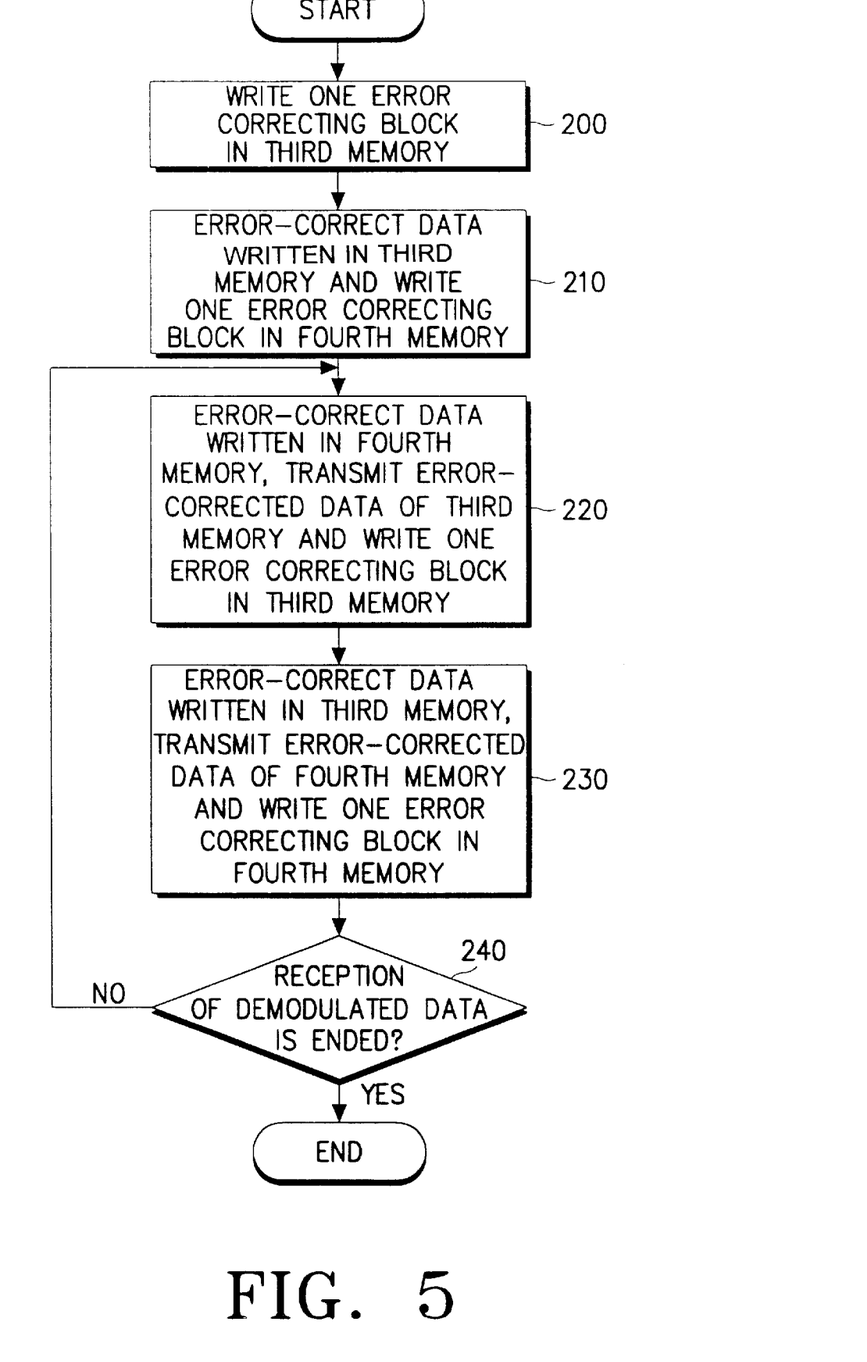
FIG. 5 is a flow chart showing a data processing procedure of a memory controller according to the embodiment of the present invention.

FIG. 4 is a detailed block diagram of the ECC memory controller 108 shown in FIG. 3. FIG. 5 is a flow chart showing a data processing procedure of a memory controller 109 illustrated in FIG. 4. Referring to FIG. 4, the third and fourth memories 130 and 140 store demodulated and error-corrected data under the control of the memory controller 109. The memory controller 109 controls the overall operation of the ECC memory controller 108 according to a data processing control program. A memory write controller 150 writes the data demodulated from the EFM demodulator 100 in the third memory 130 or the fourth memory 140 under the control of the memory controller 109. The error corrector 110 error-corrects an error correcting block including data read from the optical disk 10 of a DVD type, horizontally and vertically, in response to an ECC start signal generated from the memory controller 109. For this error correction, the third and fourth memories 130 and 140 collect ID data and main data generated from the EFM demodulator 100 and store the data by blocks to form the error correcting block. A memory read controller 160 reads data stored in the third memory 130 or the fourth memory 140 under the control of the memory controller 109 and transmits the read data to the descrambler and error detector 112.

Referring to FIG. 5, the data processing procedure of the memory controller 109 is executed in synchronization with an ECC synchronous signal.

The memory controller 109 writes one error correcting block in the third memory 130 at step 200. At step 210, the memory controller 109 error-corrects data written in the third memory 130 and simultaneously writes the next one error correcting block in the fourth memory 140. At step 220, the memory controller 109 error-corrects data written in the fourth memory 140, transmits data error-corrected from the third memory 130 to the memory read controller 160, and writes the next one error correcting block in the third memory 130. At step 230, the memory controller 109 error-corrects data written in the third memory 130, transmits the error-corrected data of the fourth memory 140 to the memory read controller 160, and writes the next one error correcting block in the fourth memory 140. At step 240, the memory controller 109 checks whether the reception of demodulated data has ended. If not, the memory controller 109 returns to step 220. If the demodulated data is not received from the EFM demodulator 100, the memory controller 109 completes the data processing procedure.

The above data processing procedure of the memory controller 109 will hereinafter be classified into a data write process, an error correcting process and an error-corrected data transmission process.

Figure 6:
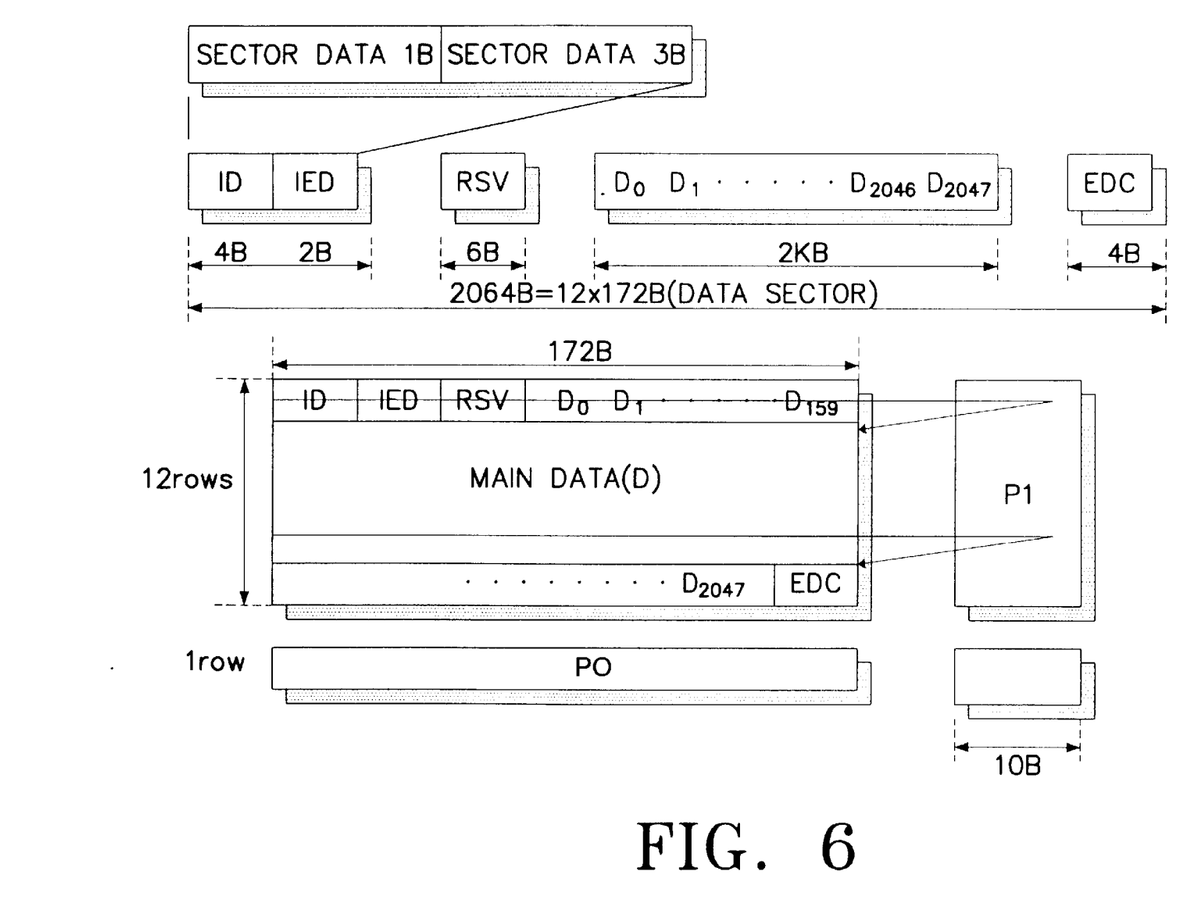
FIG. 6 shows a data sector structure after demodulation according to the embodiment of the present invention.
Figure 7:
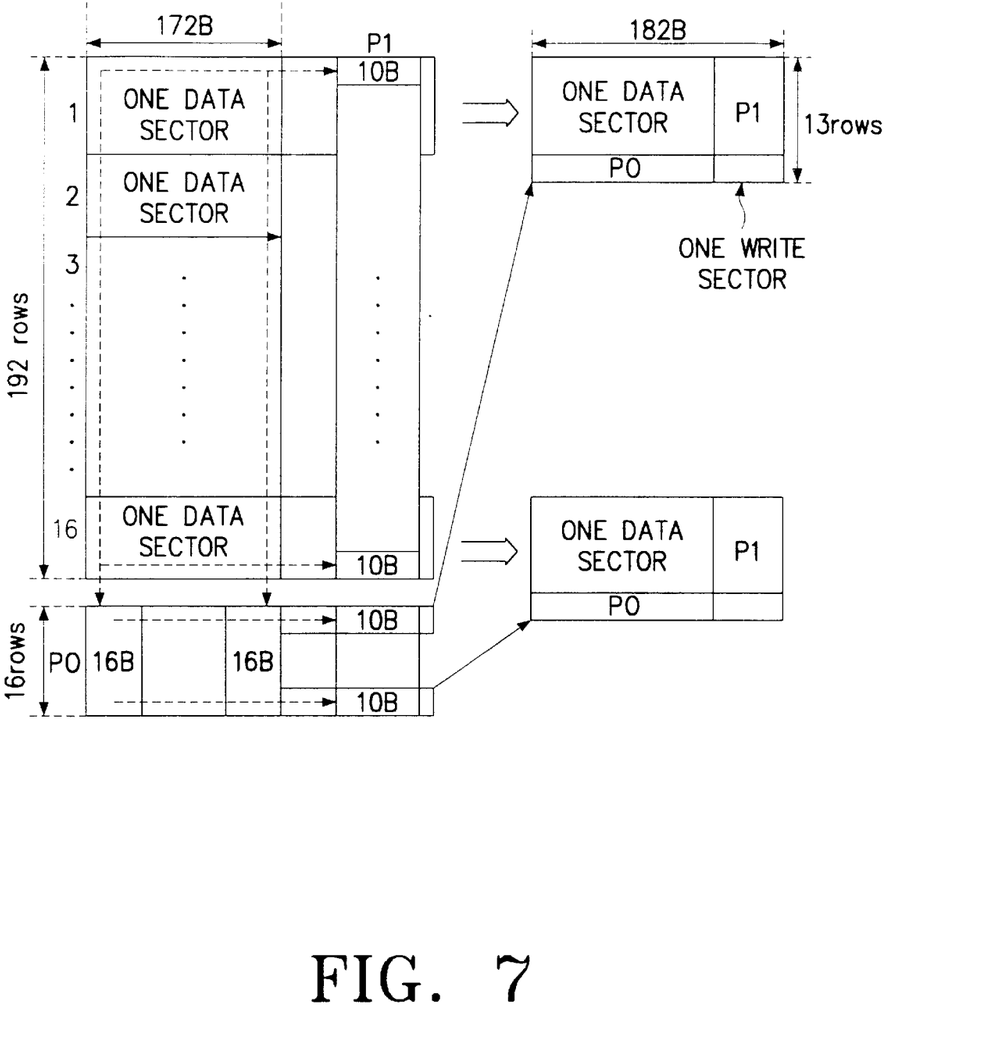
FIG. 7 shows a structure of one error correcting block according to the embodiment of the present invention.
Figure 8:
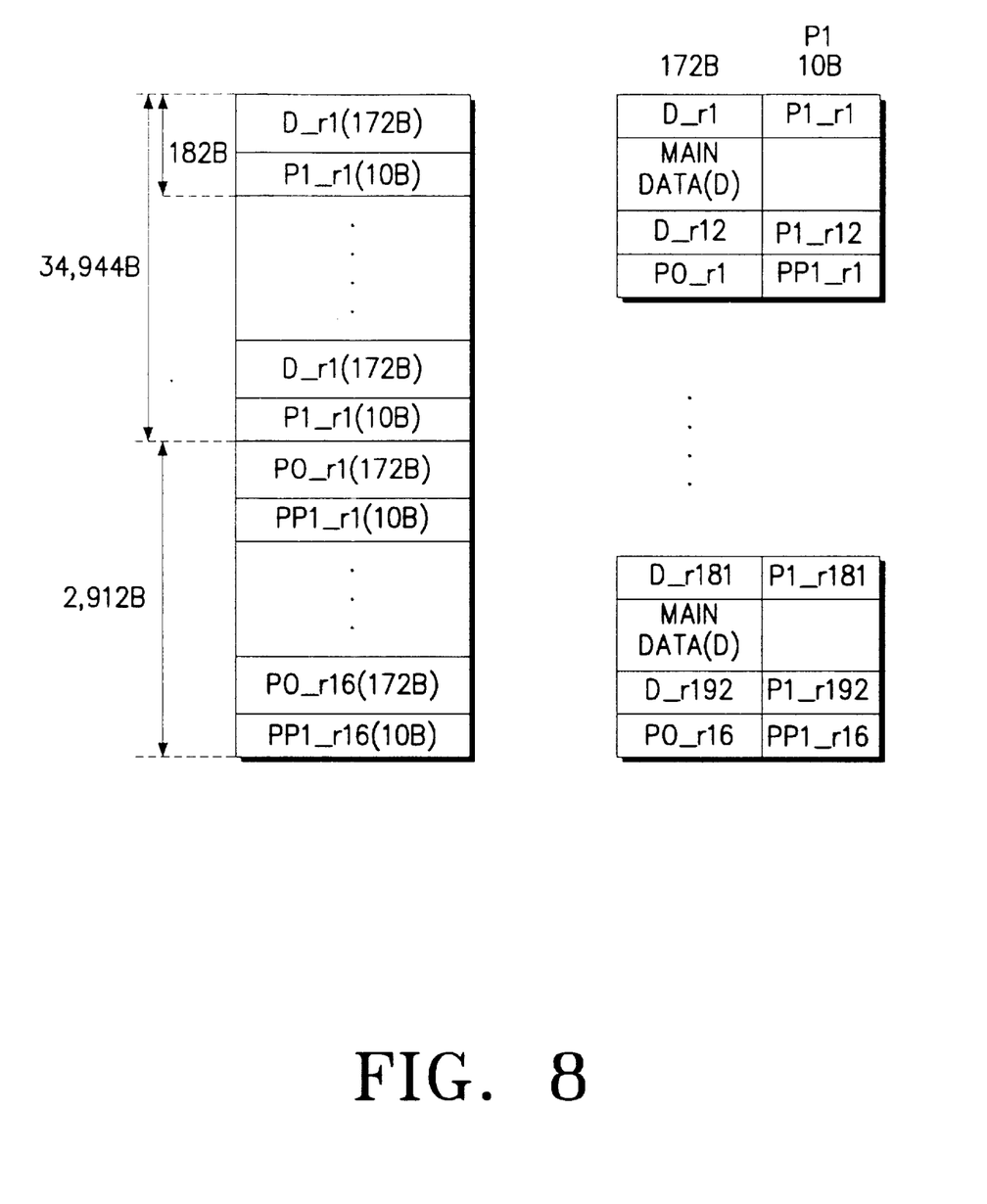
FIG. 8 shows a map structure of each of third and fourth memories according to the embodiment of the present invention.

FIG. 6 shows a data sector structure after demodulation illustrated to describe the data write process of the data processing procedure of the memory controller 109. FIG. 7 shows a structure of the one error correcting block. FIG. 8 shows a map structure of each of third and fourth memories 130 and 140. In the structure of the data demodulated from the EFM demodulator 100, main data of 2064 bytes, inner parity data PI of 130 bytes and outer parity data PO of 172 bytes constitute one sector, as shown in FIG. 6. The data is output in the unit of a block from the left side of the first row and written in the third memory 130 or the fourth memory 140. The one error correcting block includes 16 data sectors as indicated in FIG. 7 and its size is 37,856 bytes. That is:

2,064 bytes (main data)+130 bytes (PI)+172 bytes (PO)=2,366 bytes (one data sector)

2,366 bytes×16=37,856 bytes (one error correcting block) (1)

For error correction, the 16 data sectors should be correctly written in the third memory 130 or the fourth memory 140 as the error correcting block. The data demodulated from the EFM demodulator 100 with respect to the ECC synchronous signal is alternatively written in the third and fourth memories 130 and 140 by the unit of 16 data sectors. In this case, the main data, PI and PO are written in a predetermined position of a memory map by the unit of a word (2 bytes). When a one-word write time is designed to 3T or 4T of the system clock PLCK, the data write time of the one error correcting block is listed below in Table 1.

TABLE 1

| Speed | PLCK [MHz] | 3T/4T [ns] | Accessed number | Access Time [ms] | Write Limit Time [ms] |
|---|---|---|---|---|---|
| 1× | 27 | 111/148 | 18,928 | 2.1/2.8 | 22.92 |
| 2× | 54 | 55.5/74 | | 1.05/1.4 | 11.46 |
| 4× | 108 | 27.8/37 | | 0.525/0.7 | 5.73 |
| 6× | 162 | 18.5/24.69 | | 0.35/0.47 | 3.82 |
| 8× | 216 | 13.9/18.5 | | 0.263/0.35 | 2.86 |

In the error correcting process of the data processing procedure of the memory controller 109, if the data of the one error correcting block is written in either the third memory 130 or the fourth memory 140, the memory controller 109 generates the ECC start signal to begin to correct the error. After PI error correction is completed, the PO error correction is performed, and the same process is repeated once more. Although the EFM demodulated data has the structure of the one error correcting block as shown in FIG. 7, it should be written in the memory map shown in FIG. 8. For the PI error correction of the first row indicated in FIG. 7, data of 172 bytes is read from a data region and data of 10 bytes is read from a PI region to detect and correct the error. The error-corrected data is again written in a position where the error occurs. The PI error correction is performed with respect to both the main data and PO. To calculate a syndrome, an error position and an error value of one row, the data and parity of 182 bytes are read by the unit of a word. Since the maximum number of bytes per row which can correct the error is 10 bytes, reading and writing are repeated by 10 times. The memory accessed number for the PI error correction is obtained by the following equation (2). That is, the error correcting memory is accessed a maximum of 23,088 times.

syndrome, error position, error value: 182×208=37,856 bytes error correction: (10×208)×2=4,160 bytes maximum accessed number: 37,856/2+4,160=23,088 (2)

Since the PO error correction is performed in the column direction by the unit of a byte, the memory should be accessed by the unit of a byte. To calculate the syndrome, error position and error value of one column, the data and parity of 208 bytes are read. The maximum number of bytes per column which can correct the error is 16 bytes. The maximum memory accessed number for the PO error correction is 43,680, as calculated in the following equation (3):

syndrome, error position, error value: 208×182=37,856 bytes error correction: (16×182)×2=5,824 bytes maximum accessed number: 37,856+5,824=43,680 (3)

Therefore, in the error correction of PI+PO+PI+PO, the maximum accessed number is 145,440=((23,088+43,680)× 2). If the memory access time is 3T or 4T of the system clock PLCK, the error correcting time of the one error correcting block is shown in the following Table 2.

TABLE 2

| Speed | PLCK [MHz] | 3T/4T [ns] | Accessed number | Access Time [ms] | Write Limit Time [ms] |
|---|---|---|---|---|---|
| 1× | 27 | 111/148 | 133,536 | 14.82/19.72 | 22.92 |
| 2× | 54 | 55.5/74 | | 7.41/9.885 | 11.46 |
| 4× | 108 | 27.8/37 | | 3.705/4.9425 | 5.73 |
| 6× | 162 | 18.5/24.69 | | 2.47/3.297 | 3.82 |
| 8× | 216 | 13.9/18.5 | | 1.8525/2.471 | 2.86 |

In the error-corrected data transmission process of the data processing procedure of the memory controller 109, the error-corrected data is transmitted to the descrambler and error detector 112. Since the transmitted data is 2064 bytes per sector, the one error correcting block has 16,512 words to be transmitted. The transmission time of the one error correcting block is listed below in Table 3.

TABLE 3

| Speed | PLCK [MHz] | 3T/4T [ns] | Accessed number | Access Time [ms] | Write Limit Time [ms] |
|---|---|---|---|---|---|
| 1× | 27 | 111/148 | 16,512 | 1.84/2.44 | 22.92 |
| 2× | 54 | 55.5/74 |  | 0.92/1.22 | 11.46 |
| 4× | 108 | 27.8/37 |  | 0.46/0.61 | 5.73 |
| 6× | 162 | 18.5/24.69 |  | 0.3/0.4 | 3.82 |
| 8× | 216 | 13.9/18.5 |  | 0.23/0.305 | 2.86 |

On the other hand, the error correcting memory 28 is divided into the third and fourth memories 130 and 140 as illustrated in FIG. 3. After the demodulated data is recorded in one memory (A), demodulated data is recorded in the other memory (B) during the performance of error correction in the memory (A). Upon completing error correction for the demodulated data recorded in the memory (A), then the data recorded in the memory (A) is read. As shown in the above Tables 1, 2 and 3, the accessed number within a give time is determined. For example, in quadruple speed, if the access time of one word is 4T of the system clock PLCK, the accessed number per one error correcting block of the memory in which the demodulated data is written and data reading for transmitting the data to the descrambler and error detector 112 is performed is 35,440= (writing 18,928+ reading 16,512), and the access time is 1.31 ms. During the error correction, since the error correcting time is 4.9425 ms in the accessed number of 133,536, if the accessed number is 141,760, the error correcting time is 5.245 ms. Since the input time of the one error correcting block from the disk 10 is 5.73 ms, the error correction is completed within this input time. Moreover, in octuple speed, when the access time of one word is 4T of the system clock PLCK, the access time of the one word is 18.5 ns. If a memory having the access time of 18.5 ns or less is used, since the error correcting time is 2.62 ms and the data input time is 2.86 ms, the error correction is sufficiently performed within a given time.

As noted above, when the data reproduced from the optical disk is alternatively written in two error correcting memories, the error-corrected data is read from one memory and the error correction is implemented from another memory. Hence, the data processing speed is improved and the data transmission time can be reduced.

What is claimed is:

1. A system decoder of an optical disk reproducing apparatus having a descrambler for restoring scrambled data in the process of encoding data, said system decoder comprising:

first and second memories for correcting an error in the scrambled data; and a memory controller for transmitting error-corrected data to said descrambler while data read and demodulate from said optical disk is written in one of said first and second memories, and error-correcting data written in the other one of said first and second memories while the demodulated and error-corrected data is written and read.

2. The system decoder as claimed in claim 1, wherein said memory controller performs error correction and data access in synchronization with an error correction synchronous signal.

3. The system decoder as claimed in claim 2, further comprising a single chip on which said first and second memories are formed.

4. The system decoder as claimed in claim 3, wherein said optical disk reproducing apparatus is a digital video disk player.

5. A method for controlling first and second error correcting memories of an optical disk reproducing apparatus, comprising the steps of:

alternatively writing one error correcting block in said first and second memories upon receiving demodulation data of data sectors each including main data, inner parity data and outer parity data;

error-correcting a corresponding one error correcting block; and reading error-corrected data from one of said first and second memories when writing one error correcting block in the other one of said first and second memories.

6. The method as claimed in claim 5, wherein each of said first and second memories has a main data region, an inner parity data region and an outer parity data region, and said main data, inner parity data and outer parity data constituting a corresponding data sector are separately written upon receiving demodulation data of one of the data sectors.

7. The method as claimed in claim 5, wherein said one error correcting block comprises 16 data sectors.

8. The method as claimed in claim 5, further comprising a single chip on which said first and second memories are formed.

9. An optical disk reproducing apparatus to decode data stored on an optical disk, comprising:

first and second memories to store the data read from the optical disk and correct errors in the data read from the optical disk; and a memory controller to perform the error correction of the data in one of the first and second memories and simultaneously writing new data read from the optical disk into the other one of said first and second memories.

10. The optical disk reproducing apparatus as claimed in claim 9, wherein said memory controller reads error corrected data from the other one of said first and second memories prior to writing the new data therein, while simultaneously performing the error correction of the data in the one of said first and second memories.

11. The optical disk reproducing apparatus as claimed in claim 10, wherein each of said first and second memories is a static random access memory (SRAM).

12. The optical disk reproducing apparatus as claimed in claim 9, further comprising a descrambler to descramble the error corrected data read from each of said first and second memories.

13. The optical disk reproducing apparatus as claimed in claim 12, further comprising:

an optical pickup to read the data from the optical disk; and a demodulator to demodulate the data read from the optical disk prior to storage in said first and second memories.

14. The optical disk reproducing apparatus as claimed in claim 12, further comprising a synchronous detector to detect a synchronous signal from the data read from the optical disk, wherein said memory controller performs the error correction in each of said first and second memories in accordance with said synchronous signal.

15. The optical disk reproducing apparatus as claimed in claim 10, wherein said memory controller writes the new data into the other one of said first and second memories in the form of a block having a plurality of data sectors, each data sector including main data, inner parity data, and outer parity data.

16. The optical disk reproducing apparatus as claimed in claim 15, wherein each block includes sixteen data sectors, wherein each data sector has 2064 bytes of main data, 130 bytes of inner parity data, and 172 bytes of outer parity data.

17. The optical disk reproducing apparatus as claimed in claim 15, wherein said memory controller writes the data into a predetermined position of a memory map of the other one of said first and second memories in units of words having two bytes.

18. The optical disk reproducing apparatus as claimed in claim 9, wherein said memory controller performs inner parity correction by rows of the data and then performs outer parity error correction by columns of the data, in the one of said first and second memories.

19. The optical disk reproducing apparatus as claimed in claim 9, wherein said memory controller calculates a syndrome, an error position and an error value of one row of the data in the one of said first and second memories by reading the data and parity of a predetermined number of bytes in units of words.

20. An optical disk reproducing apparatus to decode data stored on an optical disk, comprising:

first and second memories to store the data read from the optical disk and correct errors in the data read from the optical disk; and a memory controller to perform the error correction of the data in one of the first and second memories and simultaneously reading previously error corrected data from the other one of said first and second memories.

21. The optical disk reproducing apparatus as claimed in claim 20, further comprising a descrambler to descramble the error corrected data read from each of said first and second memories.

22. The optical disk reproducing apparatus as claimed in claim 20, wherein said memory controller performs inner parity correction by rows of the data and then performs outer parity error correction by columns of the data, in the one of said first and second memories.

23. A method for controlling first and second error correcting memories of an optical disk reproducing apparatus which reads data from an optical disk, comprising the steps of:

alternately writing the data into the first and second error correcting memories; and error correcting the data using one of the first and second error correcting memories while simultaneously writing the data into the other one of the first and second error correcting memories.

24. The method as claimed in claim 23, further comprising the step of reading previously error corrected data from the other one of the first and second error correcting memories while simultaneously writing the data into the one of said first and second memories.

25. The method as claimed in claim 24, further comprising the step of descrambling the read previously error corrected data.

26. The method as claimed in claim 25, further comprising the step of demodulating the data read from the optical disk prior to writing the data into the first and second error correcting memories.

27. A method for controlling first and second error correcting memories of an optical disk reproducing apparatus which reads data from an optical disk, comprising the steps of:

error correcting the data by alternately using the first and second error correcting memories; and reading the error corrected data from one of the first and second error correcting memories while simultaneously error correcting the data in the other one of the first and second error correcting memories.

28. A method for controlling first and second error correcting memories of an optical disk reproducing apparatus which reads data from an optical disk, comprising the steps of:

(a) writing a first error block of the data into the first error correcting memory;

(b) error correcting the error block of the data in the first error correcting memory and simultaneously writing a second error block of the data into the second error correcting memory;

(c) error correcting the second block of the data of the second error correcting memory and, simultaneously, reading the corrected first error block from the first error correcting memory and then writing a third error correcting block into the first error correcting memory;

(d) error correcting the third block of the data of the first error correcting memory and, simultaneously, reading the corrected second error block from the first error correcting memory and then writing a fourth error correcting block into the second error correcting memory; and (e) repeating the steps (a) through (d) until there is no more of the data to be read from the optical disk.

* * * * *